(12) United States Patent
Kawamura et al.

(10) Patent No.: US 6,404,430 B1
(45) Date of Patent: Jun. 11, 2002

(54) VIRTUAL SPACE INFORMATION PROCESSOR

(75) Inventors: Katsumi Kawamura; Kengo Nakajima, both of Suita (JP)

(73) Assignee: Digipark, Inc., Tokyo (JP)

( * ) Notice: Subject to any disclaimer, the term of this patent is extended or adjusted under 35 U.S.C. 154(b) by 0 days.

(21) Appl. No.: 09/171,361

(22) PCT Filed: Feb. 18, 1998

(86) PCT No.: PCT/JP98/00678

§ 371 (c)(1),
(2), (4) Date: Oct. 16, 1998

(87) PCT Pub. No.: WO98/37497

PCT Pub. Date: Aug. 27, 1998

(30) Foreign Application Priority Data

Feb. 19, 1997 (JP) ............................................. 9-52365

(51) Int. Cl.[7] ............................................. G06T 15/00
(52) U.S. Cl. ......................................................... 345/427
(58) Field of Search ................................. 345/419, 427, 345/420, 426, 428, 473, 474, 475

(56) References Cited

U.S. PATENT DOCUMENTS 6,278,455 B1 * 8/2001 Baker .......................... 345/473

FOREIGN PATENT DOCUMENTS

| JP | 5-113941 | 5/1993 |
|----|----------|--------|
| JP | 8-077255 | 3/1996 |

* cited by examiner

Primary Examiner—Phu K. Nguyen
(74) Attorney, Agent, or Firm—Keating & Bennett, LLP

(57) ABSTRACT

A virtual space information processor provides data relating to a virtual space to a plurality of client terminals on a real-time basis. All modules for processing all of the data defining the virtual space, and requests from the client terminals are pre-loaded on a memory. The modules include at least a request-storing module which stores more than one request from the client terminals and a space definition data-updating module which updates, according to the requests from the client terminals, the data defining the virtual space. The space definition data-updating module does not start processing of requests from other client terminals until the processing of the request from one of the client terminals is completed. Besides, the virtual space information processor includes a request processing control module which selects an appropriate module for processing a request stored in the request-storing module and instructs the selected module to process the request. Moreover, processing instructions from the request processing control module to individual modules are transmitted via a connection interface. Furthermore, modules of the same type are not double-loaded on the memory.

3 Claims, 5 Drawing Sheets

VIRTUAL SPACE INFORMATION PROCESSOR

FIELD OF THE INVENTION

The present invention relates to a virtual space information processor to which a plurality of client terminals can be connected and which achieves real time processing of requests from individual client terminals even when many client terminals are connected.

BACKGROUND OF THE INVENTION

Recently, virtual space information processors have been widely used, wherein virtual spaces, such as a virtual shopping mall and the like, are created with a computer, and data relating to the virtual spaces are transmitted to produce images of the virtual spaces which are displayed on display devices of client terminals, using computer graphics, data bases, and the like. At present, a virtual space information processor which, in response to requests received from client terminals, loads programs (referred to as modules hereafter) that have been prepared for individual functions, on to a memory, and executes the programs (referred to as processes hereafter) to perform processes corresponding to individual requests is known as a widely used virtual space information processor.

However, with a conventional virtual space information processor, a module is read out from a storage device and loaded on the memory, then a process corresponding to a request from an individual client terminal is executed each time that a request for data transmission or the like is received from a client terminal. This requires an enormous amount of time for responding to a single request. Thus, a request from a client terminal can not be handled on a real-time basis, which eventually irritates the user operating the client terminal. The problem becomes worse when a plurality of client terminals are connected.

In addition, a plurality of modules for the same function must be loaded on the memory in conventional virtual space information processors since a module is loaded on the memory each time that a request is received from an individual client terminal, which means that most of the memory is consumed by modules. Therefore, a very large memory capacity is required to process requests from a plurality of client terminals.

Furthermore, a very long processing time has been required for conventional virtual space information processors because process communication between individual processes on the memory is necessary to transmit to individual client terminals data that is consistent with regard to the virtual space. Therefore, processing or responding to a plurality of client terminals has been difficult and there has been a limit to the number of client terminals that can be connected.

The above-mentioned problems with regard to processing time or the memory resource can be solved either by physically enhancing the memory or CPU of the virtual space information processor, or by adding a large number of processor apparatuses. However, these measures are not acceptable solutions to the problems, described above because of the huge increase in cost due to necessity of enhanced memory or providing additional devices.

BRIEF SUMMARY OF THE INVENTION

To overcome the problems described above, the preferred embodiments of the present invention provide a virtual space information processor that is capable of processing requests from individual client terminals on a real time basis when a plurality of client terminals are connected, as well as being able to connect a plurality of client terminals with a relatively small scale hardware resource.

A virtual space information processor according to preferred embodiments of the present invention has all of the modules for processing requests from client terminals preloaded on a memory. Therefore, loading a module each time a process is requested from a client terminal becomes unnecessary with the above-described preferred embodiment, which results in a significantly reduced response time.

The preferred embodiments of the present invention include a request-storing module which stores more than one request from client terminals and a space definition data-updating module which updates, according to requests from client terminals, the data defining the virtual space. The space definition data-updating module does not start processing requests from other client terminals until the processing of the request from a first of the client terminals is completed, which ensures that consistent virtual space data is available to each of the individual client terminals.

Furthermore, the preferred embodiments of the present invention include a request processing control module which selects an appropriate module for processing a request stored in the request-storing module and instructs the selected module to process the request. Thus, processing instructions can be transmitted smoothly to the appropriate module, which results in a significantly reduced response time.

Additionally, according to preferred embodiments of the present invention, processing instructions from the request processing control module to individual modules are transmitted via a connection interface. Thus, processing instructions are transmitted even more smoothly to the appropriate module, which results in an even greater reduction in response time.

Furthermore, modules of the same type are not double-loaded on the memory, which prevents waste of memory caused by duplication of modules.

DETAILED DESCRIPTION OF PREFERRED EMBODIMENTS

The above described and other objects, features and advantages of the present invention, may be better understood with reference to the following detailed description, with the accompanying drawings, of preferred embodiments of the invention.

Figure 1:
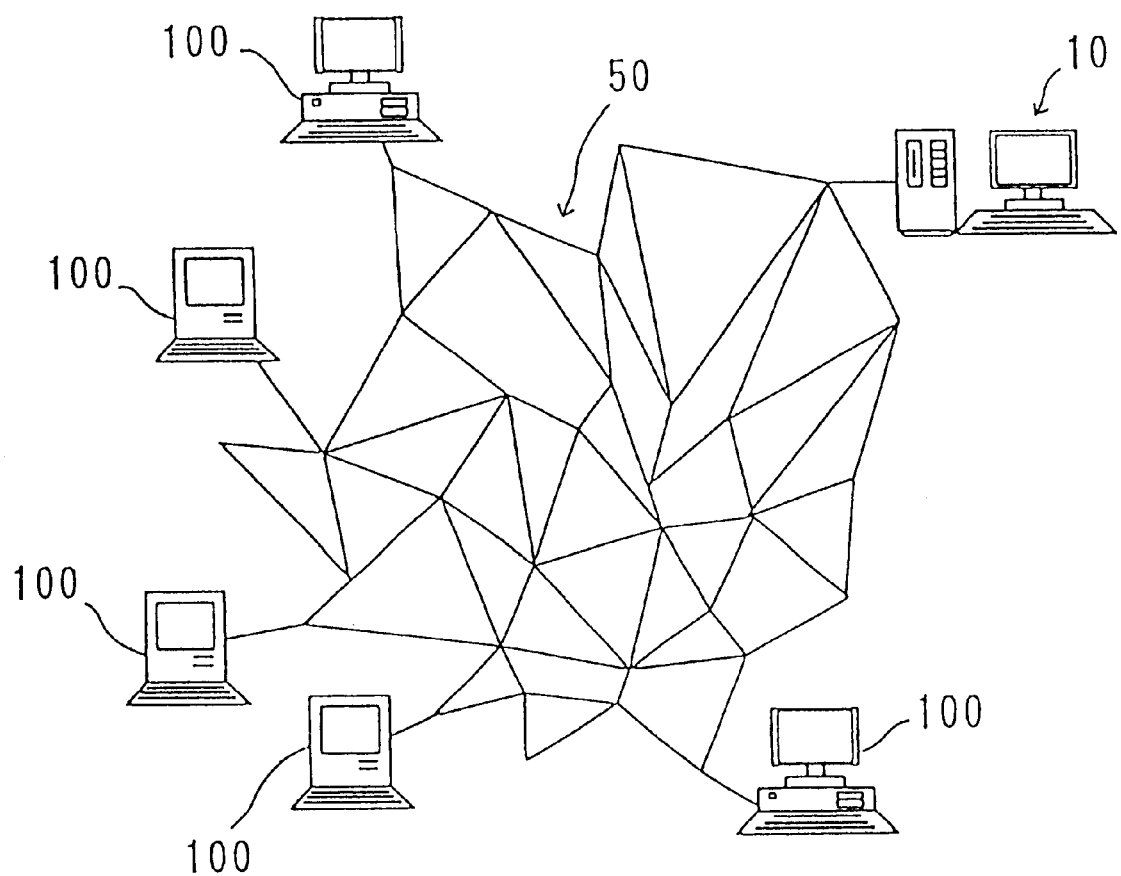
FIG. 1 is a schematic diagram illustrating an example of operations of a virtual space information processor according to a preferred embodiment of the present invention.

FIG. 1 is a schematic diagram illustrating an example of operations of a virtual space information processor according to a preferred embodiment of the present invention. As shown in FIG. 1, a virtual space information processor 10, to which any number of client terminals 100 are connected via a communication network 50, is constructed so that information with regard to a virtual space constructed in the virtual space information processor 10 can be provided to individual client terminals. Here the virtual space information processor 10 which will be described hereinafter is preferably constructed so that games using the virtual space can be played by a plurality of users on individual client terminals 100.

Although the Internet is used as the communication network 50 in this preferred embodiment, other types of networking devices, systems and means can be used such as a public switched telephone network, an ISDN network, or a LAN. Likewise, a communication protocol to be used is not limited to TCP/IP (Transmission Control Protocol/Internet Protocol) used in this preferred embodiment but other communication protocols can also be used.

Figure 2:
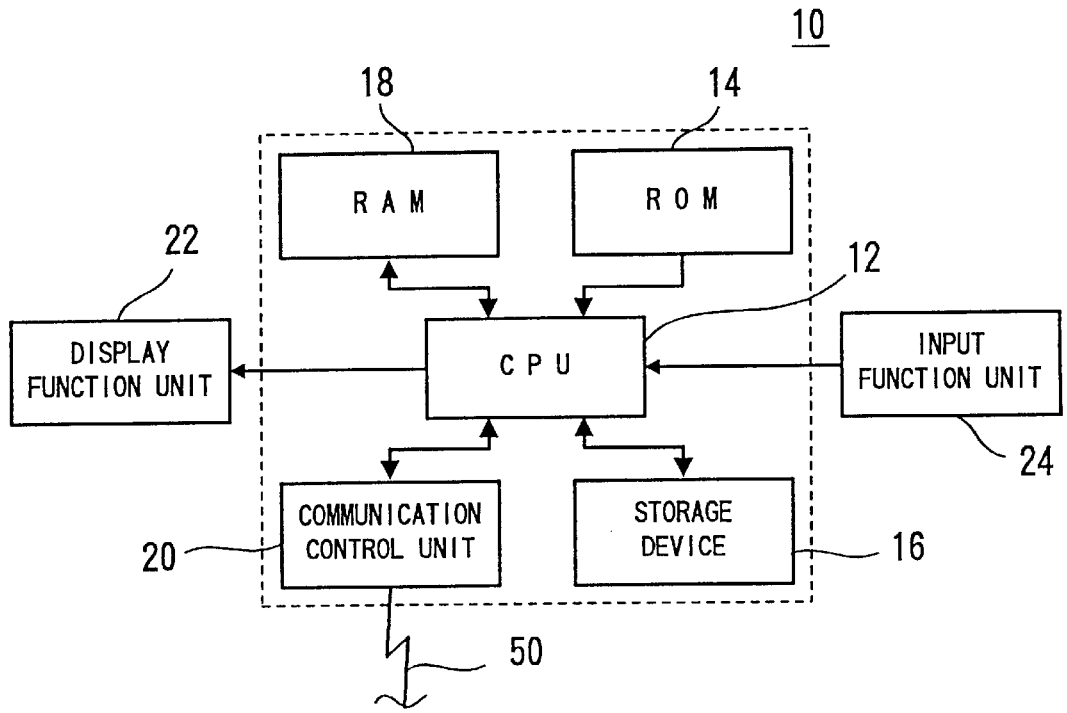
FIG. 2 is a block diagram illustrating a hardware composition of a virtual space information processor.

FIG. 2 is a block diagram illustrating a hardware composition of the virtual space information processor 10. The virtual space information processor 10 preferably includes a CPU 12 for processing definition data or the like which defines the virtual space. A ROM 14 for storing programs such as the BIOS (Basic Input/Output System) is connected to the CPU 12. A storage device 16 such as a hard disk drive is connected to the CPU 12, for storing definition data which defines the virtual space in an unchanged initial state, or a variety of modules which perform various processing of the virtual space. Furthermore, a RAM 18 is connected to the CPU 12, for loading definition data which defines the virtual space required for executing a variety of processes, or a variety of modules, during operation of the virtual space information processor 10.

Moreover, a communication control unit 20, a display function unit 22, and an input function unit 24 are connected to the CPU 12. The communication control unit 20, such as a modem or a terminal adapter, establishes data communication with a plurality of client terminals 100 via the communication network 50 and controls data transmission and reception. The display function unit 22, such as a CRT or an LCD, is composed so that the virtual space constructed in the virtual space information processor 10 can be viewed and identified as characters or images. The input function unit 24, such as a keyboard or a mouse, is used for inputting characters or symbols, or pointing to locations on the display function unit 22.

Figure 3:
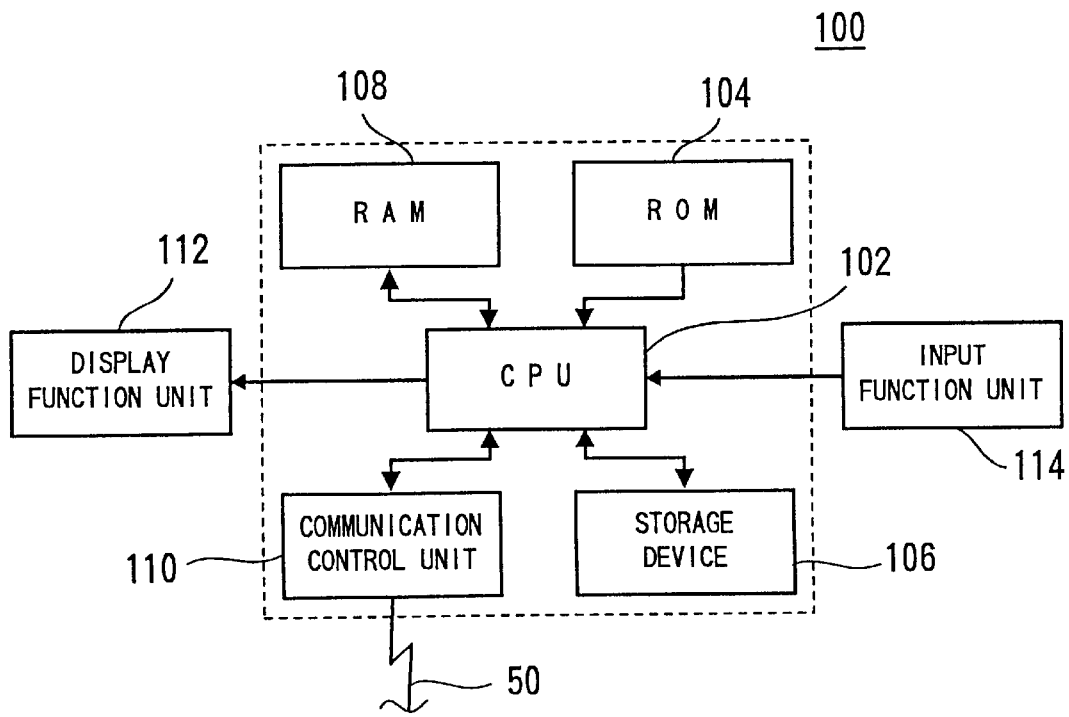
FIG. 3 is a block diagram illustrating a hardware composition of a client terminal.

FIG. 3 is a block diagram illustrating a hardware composition of the client terminals 100. The client terminals 100, as shown in FIG. 3, are of a basically similar composition to that of the virtual space information processor 10, having a CPU 102, a ROM 104, a storage device 106, a RAM 108, a communication control unit 110, a display function unit 112 and an input function unit 114. The storage device 106, unlike with the virtual space information processor 10, does not store definition data or data which defines the virtual space. Also, the storage device 106 of the client terminals 100 stores an HTTP browser such as Netscape Navigator ∃, and unlike the case with the virtual space information processor 10, the client terminal 100 is composed so that data written in HTML (Hyper Text Markup Language) format can be displayed on the display unit 112 according to the tag contents.

Figure 4:
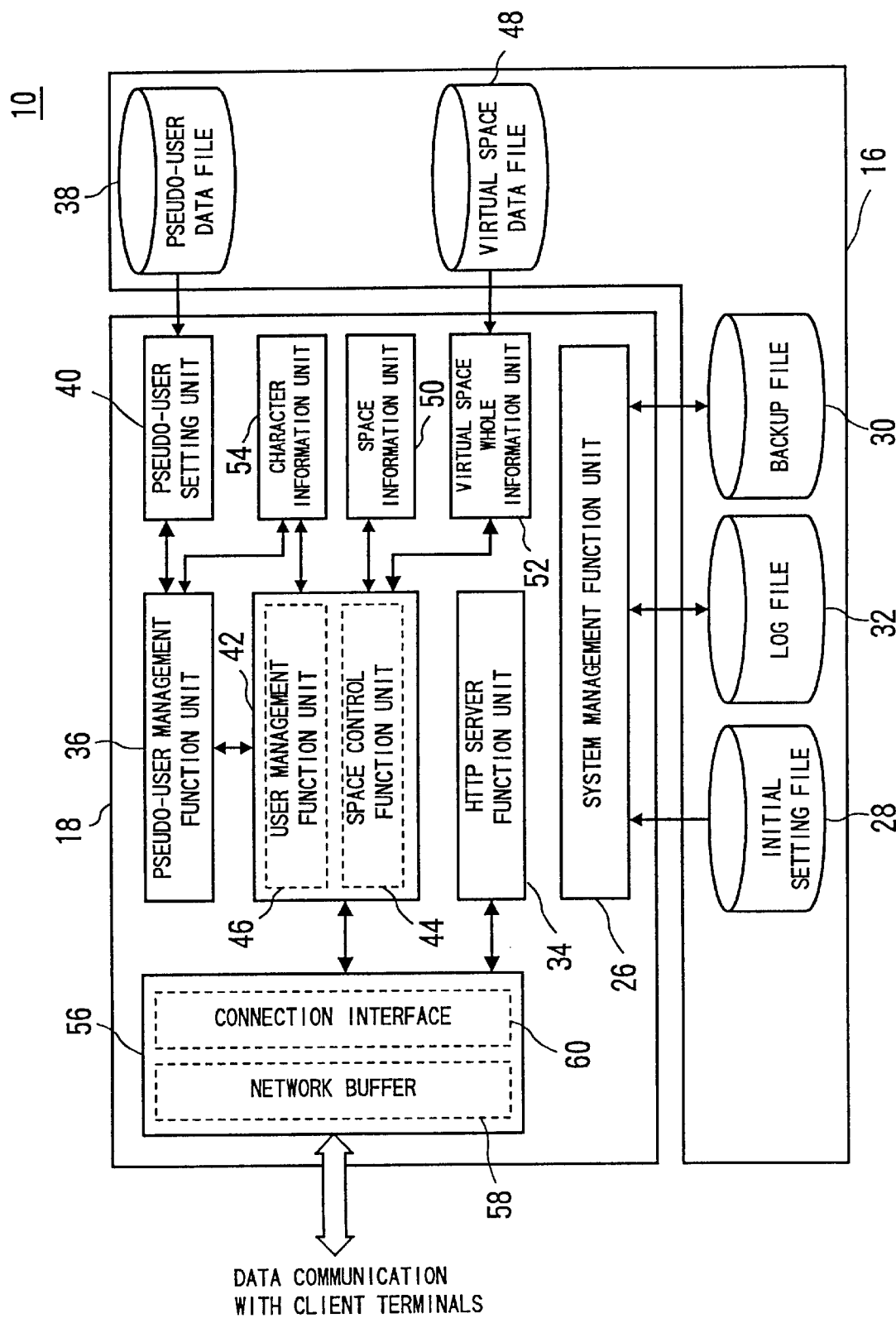
FIG. 4 is a schematic diagram illustrating a system composition of a virtual space information processor.

The system process performed at start-up of the virtual space information processor 10, and the system composition of the virtual space information processor 10 will be described next with reference to FIG. 4. FIG. 4 is a schematic diagram illustrating a system composition of the virtual space information processor 10.

When the virtual space information processor 10 is powered on, the BIOS stored in the ROM 14 is automatically executed first, a hardware test is performed to check abnormality in the virtual space information processor 10, identification of peripheral devices is performed, and the OS (Operating System) stored in the storage device 16 is loaded and booted. Although UNIX ∃ is used as the OS in this preferred embodiment, other types of OS can also be used.

Then, a system management function unit 26, an HTTP server function unit 34, a pseudo-user management function unit 36, and a response function unit 42 are read out from the storage device 16 and loaded onto the RAM 18. At the same time, file areas of a pseudo-user setting unit 40 for recording data generated and applied by the above-mentioned module, a character information unit 54, a space information unit 50, and a virtual space information unit 52 are allocated on the RAM 18. Hereinafter, individual modules and files will be described in detail.

The system management function unit 26 performs setting of the initial operation of the virtual space information processor 10. Initial setting of the operation of the virtual space information processor 10 is performed according to the description in an initial setting file 28 stored in the storage device 16. Here in the initial setting file 28, data is written such as: the location in the storage device 16 of data file to be used by the virtual space information processor 10 or the like, the maximum number of the client terminals 100 to be connected to the virtual space information processor 10, or the time-out period with the client terminals 100. Based on these setting values, an initial setting of the virtual space information processor 10 such as setting for data transmission or reception between the client terminals 100 is performed.

Besides, the system management function unit 26, also including a function for monitoring and controlling the operation of the virtual space information processor 10, monitors and controls the entire apparatus during operation together while recording into a backup file 30 the contents of backup. Here, the contents of backup include the modules and all of the data loaded on the RAM 18 at an arbitrary time during operation of the virtual space information processor 10. Updating of the backup file 30 is performed according to the time interval of recording into the backup file 30 described in the initial setting file 28.

Additionally, the system management function unit 26 records a log into a log file 32 in the storage device 16. A log is the entire record of updating of the virtual space since the virtual space information processor 10 was started up, which is recorded in a time sequence order. In case of an abnormal termination, the virtual space information processor 10 can, because of the above-mentioned file composition, return to the state before the abnormal termination by loading the contents of the backup file 30 into the RAM 18. If any failure makes the backup file 30 unavailable, restoration to the state before the abnormal termination can be achieved by re-executing the processes since the initial state of the virtual space information processor 10 according to the contents of the log file 32.

The HTTP server function unit 34 determines whether any one of the client terminals 100 requesting connection to the virtual space information processor 10 is from an authorized user, based on information including a user ID number and password recorded in the storage device 16. When the connection request is from a user authorized to connect to the virtual space information processor 10, HTTP (Hyper Text Transfer Protocol) connection between the client terminal is established, programs necessary for displaying the virtual space on the display function unit 112 of the client terminals 100 are transmitted, and data communication is appropriately performed to maintain the connection with the client terminal. The pseudo-user management function unit 36 is a module for performing and controlling pseudo-users loaded in the virtual space constructed in the virtual space information processor 10. Here, a pseudo-user is a character generated by the pseudo-user management unit 36, and the behavior of which in the virtual space is automatically controlled. Examples which can be defined as pseudo-users are: characters associated with conversation or behavior such as people moving around the virtual space, characters associated with movement only such as animals, wind, or rain, and characters displaying certain information without physical movement such as signboards. According to the description of the pseudo-user data file 38 stored in the storage device 16, the pseudo-user management function unit 36 generates data in the pseudo-user setting unit 40, an area of which is allocated on the RAM 18.

The pseudo-user data file 38 includes data defining behavior patterns corresponding to individual types of pseudo-users to be simulated in the virtual space of the virtual space information processor 10. The pseudo-user data file 38 includes data in a description format by which data can be generated in the pseudo-user setting unit 40 and immediately executed by the pseudo-user management function unit 36. Here, the pseudo-user setting unit 40, which records data assigned execution addresses out of the data stored in the pseudo-user data file 38, is composed so that the defined contents can be executed by applying the data accompanied with execution addresses to the pseudo-user management function unit 36.

The response function unit 42 includes a space control function unit 44 and a user management function unit 46. The space control function unit 44 controls and processes the virtual space constructed in the virtual space information processor 10. Based on the virtual space data file 48 recorded in the storage device 16, the space control function unit 44 generates data for the space information unit 50 and the virtual space whole information unit 52.

Figure 5:
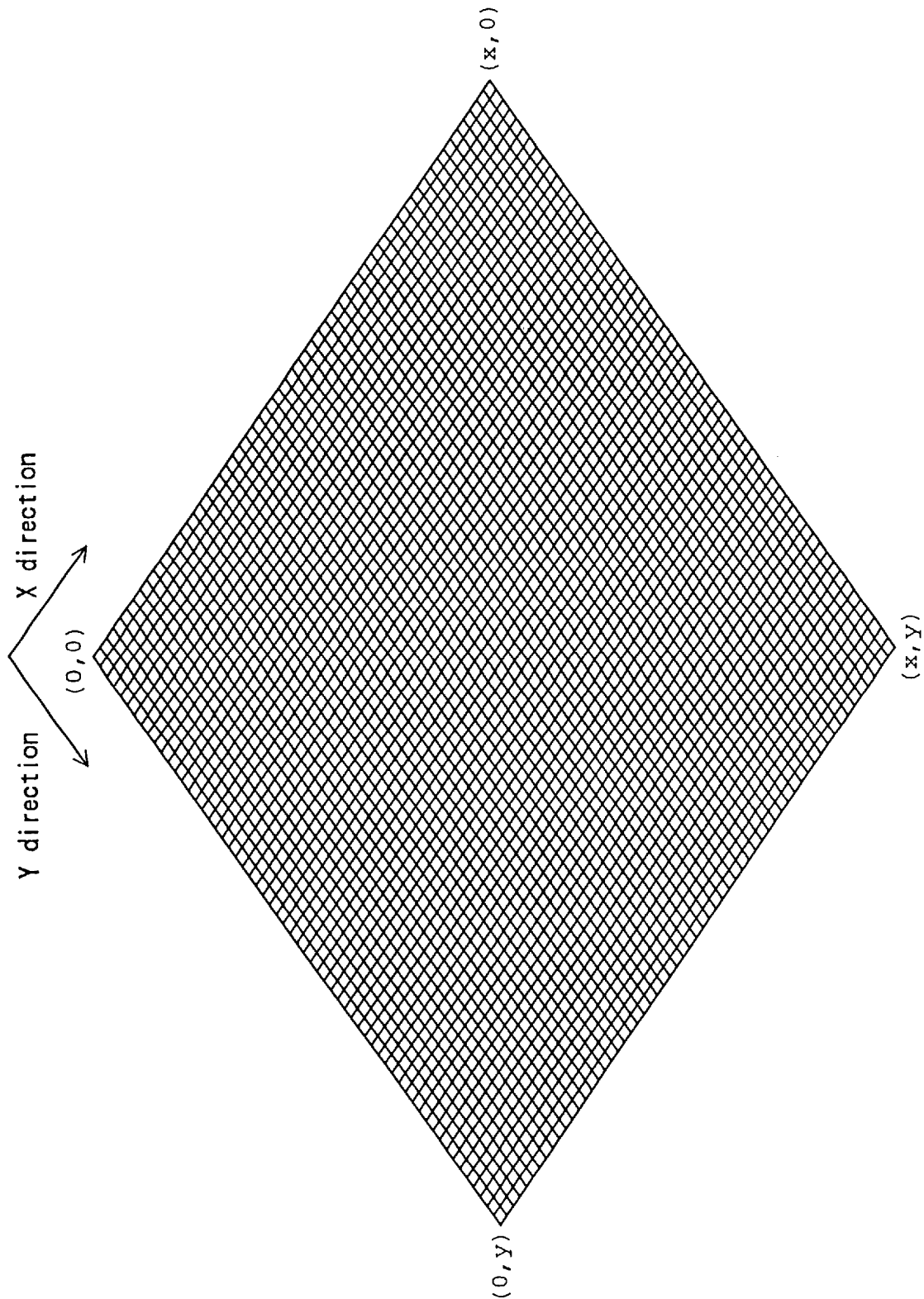
FIG. 5 is a conceptual diagram illustrating a virtual space constructed in a virtual space data file.

In the virtual space data file 48, as shown in FIG. 5, a virtual space is defined wherein positions of individual sections can be located by dividing both X and Y directions into x and y coordinates, respectively. The virtual space data file 48 also includes geographical data corresponding to individual sections of the virtual space, and image data corresponding to the geographical data. Additionally, the virtual space data file 48 includes object layout data defining the placement of objects on the sections supposed to have objects assigned thereto. Here, an object refers to a thing or item placed in the virtual space or geography different from other sections, and image data corresponding to individual objects is defined.

As stated above, the space control function unit 44 generates, based on the virtual space data file 48, data describing the location information of the virtual space at the initial stage of the virtual space information processor 10 in the space information unit 50, and data describing the location information of users or pseudo-users positioned in the virtual space in the virtual space whole information unit 52. Here, the virtual space is defined as a plane in this preferred embodiment by describing the virtual space data file 48 in two-dimensional data format. However, the virtual space can be defined as a three-dimensional space by defining location relations between a plurality of two-dimensional data. FIG. 5 is a conceptual diagram illustrating a virtual space constructed in a virtual space data file.

The user management function unit 46 is a module which grasps the status of the client terminals 100 and manages the requests transmitted from the client terminals 100. When managing the requests transmitted from the client terminals 100, the results obtained by the requests of the client terminals 100 are stored in the character information unit 54 allocated in the RAM 18. In this preferred embodiment, properties, viability, degree of experience, or the like of the characters assigned to the user in a game using the virtual space are stored.

A communication router 56 is a module which mainly controls data transmission and reception between the client terminals 100. The communication router 56 preferably has a buffer capable of queuing a plurality of requests transmitted by packet communication from the client terminals 100, and a network buffer 58 for fetching the requests from the buffer on a first-in first-out basis. The network buffer 58 also performs a function of transmitting the results of processing requests to individual client terminals 100. The communication router 56 also has a connection interface 60 which determines the contents of a request fetched from the network buffer 58 and passes the contents of the request to either the HTTP server function unit 34 or the response function unit 42. Here, fetching of a request from the network buffer 58 is controlled so that the following request will not be fetched until all the processing for the current request, having been fetched from the network buffer 58 by modules such as the HTTP server function unit 34 or the response function unit 42, are completed and the results are transmitted from the network buffer 58 to the client terminals 100.

Thus, consistency of data provided from the virtual space information processor 10 with regard to the virtual space is ensured at the same time. Besides, there is no need to add hardware such as the RAM 18 even when a great many client terminals 100 are connected to the virtual space information processor 10 because modules of the same type will not be loaded on the RAM 18 at the same time. Furthermore, the system manager can work on maintenance or change settings while the virtual space information processor 10 is operating, because processing of another request will not occur while one request is being processed.

The procedure of data communication performed between the virtual space information processor 10 and a plurality of client terminals 100 will be described next.

When a user at any of the client terminals 100 wants to enter the virtual space constructed in the virtual space information processor 10, the user inputs the URL (Uniform Resource Locator) assigned to the virtual space information processor 10 into the WWW browser. Thus, a packet in which a connection request is written is transmitted from the client terminals 100 to the virtual space information processor 10. The packet queued in the network buffer 58 is passed to the HTTP server function unit 34, after a corresponding module is selected by the connection interface 60. Then, an HTML format file prepared by the HTTP server function unit 34 for inputting a user ID and a password is transmitted to the client terminals 100 via the network buffer 58.

Figure 6:
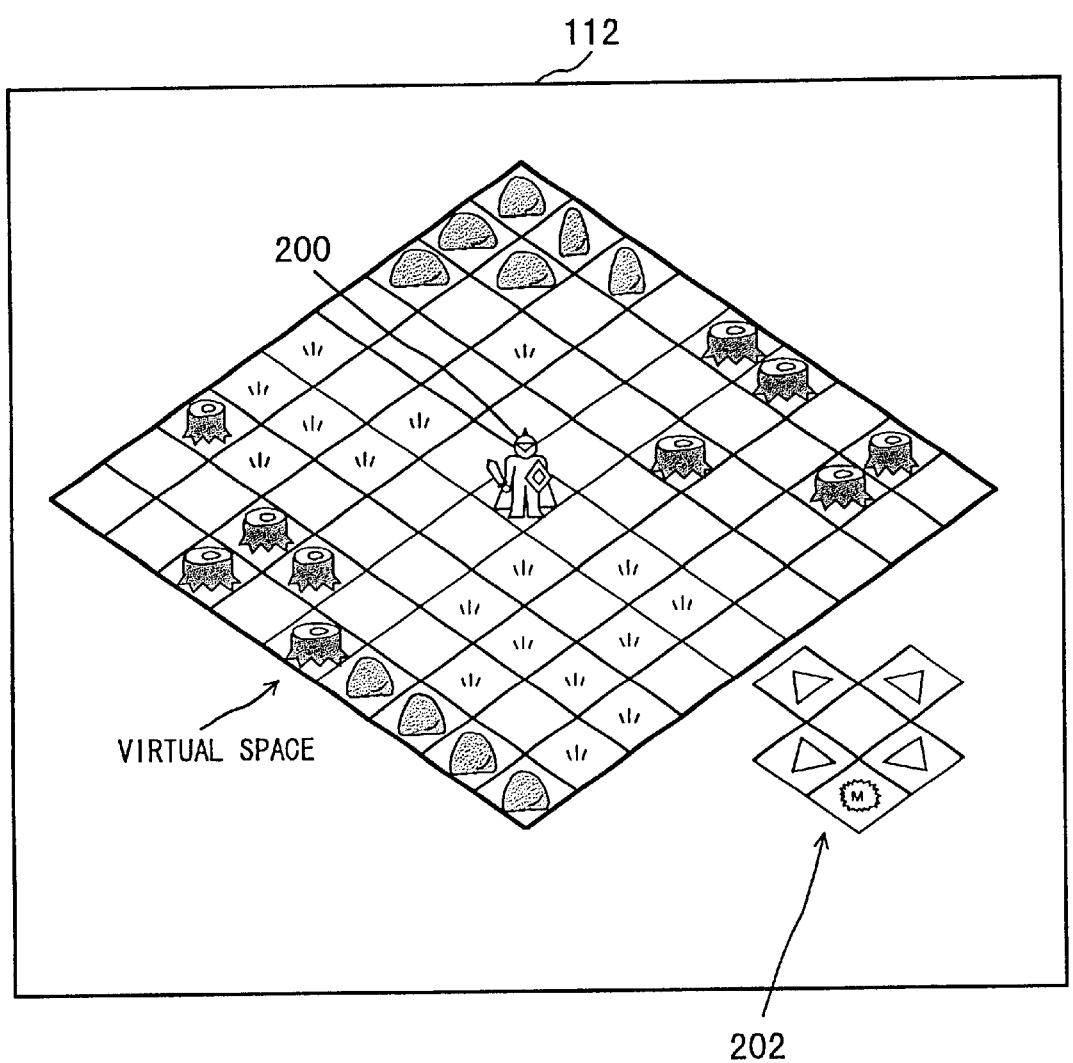
FIG. 6 is a schematic diagram illustrating a status in which a virtual space is displayed on a display unit of a client terminal.

The user inputs an appropriate user ID and password into corresponding fields displayed on the WWW browser. Then, a packet including the user ID and password is passed again to the HTTP server function unit 34 of the virtual space information processor 10. When the HTTP server function unit 34 verifies that the user is authorized to connect to the virtual space information processor 10, programs necessary for displaying the virtual space on the WWW browser, a geographical data and image data for describing a portion of the virtual space are transmitted to the client terminals 100. As a result, an image in which a user character 200 is positioned at a section of the virtual space, and more than one button 202 used for providing a variety of instructions to the character 200 are displayed on the WWW browser of the client terminal 100 as shown in FIG. 6. Thus, the user can move around or pick up an item dropped in the virtual space, by pointing to the buttons 202 displayed on the WWW browser with the input function unit 114. What the character 200 can do in the virtual space is defined in the programs transmitted by the HTTP server function unit 34. Here FIG. 6 is a schematic diagram illustrating a status in which the virtual space is displayed on the display function unit 112 of the client terminals 100.

The packet containing requests with regard to operation of the character 200, which is transmitted from the user, is sent to the user management function unit 46 to be processed after a corresponding module is selected by the connection interface 60. The user management function unit 46, according to the request if necessary, passes the process to the space control function unit 44 and the character information unit 54. When physical action of any kind takes place in the virtual space, the process is passed to the space control function unit 44, such as when the user character 200 is moving in the virtual space. When an action takes place, the space control function unit 44, according to the contents of the virtual space whole information unit 52, identifies the location of the character 200 in the virtual space. If the request is a movement in the virtual space, the space control function unit 44 changes the position of the character 200 in the virtual space by changing the position information of the character 200 in the virtual space whole information unit 52. Then, if the pseudo-user has been set to be performed at the position to which the character 200 is moved, data of the pseudo-user to be performed is read into the pseudo-user management function unit 36 from the pseudo-user setting unit 40 and will be performed. The result of the performance of the pseudo-user is transmitted to the space control function unit 44 and stored in the virtual space whole information unit 52.

If settings are made so that the character 200 may be influenced by the geography in which the character 200 is located or by the performed pseudo-user, the result is recorded, according to the settings, in the character information unit 54. Besides, if the status of the pseudo-user changes, the result is recorded in the character information unit 54. Here, data with regard to the change of the virtual space due to individual processings is transmitted not only to the client terminal 100 which requested the processing but to all the client terminals 100 which may be influenced in the virtual space by the processing.

With the virtual space information processor 10, games using the virtual space are played in the above-described manner. However, usage of the virtual space information processor 10 is not limited to games but the apparatus is useful in a variety of different applications.

As described above, the virtual space information processor according to preferred embodiments of the present invention is useful as a server for providing games or virtual shopping malls using a virtual space, a server for providing communities such as an electronic chatting room or a correspondence school, or a server for providing remote guidance.

Furthermore, the virtual space information processor of preferred embodiments of the present invention is useful as a simulation apparatus for determining the structure of a building which is ergonomically appropriate in the real world, or observing the change of human behaviors due to change in life environment by recording or analyzing the behavior of users in the virtual space. In particular, it is suitable to be used when a great many client terminals are connected.

While the invention has been particularly shown and described with reference to preferred embodiments thereof, it will be understood by those skilled in the art that the foregoing and other changes in form and details may be made therein without departing form the spirit and scope of the invention.

What is claimed is:

1. A virtual space information processor comprising:
   a memory;
   a processing unit which is connected to said memory and adapted to be connected to a plurality of client terminals via a communication network; and
   a plurality of modules for processing requests sent from said plurality of client terminals relating to behaviors in a virtual space created on the virtual space information processor; wherein
   said plurality of modules include at least a request-storing module which stores more than one request from said plurality of client terminals and a space definition data-updating module which updates, according to requests received from said plurality of client terminals, data defining the virtual space, all of said plurality of modules being pre-loaded on said memory and respective ones of said plurality of modules with are of the same type not being double-loaded on said memory, wherein
   said space definition data-updating module does not begin processing requests from subsequent ones of said plurality of client terminals until processing of a request received from a first of said plurality of client terminals is completed.

2. The virtual space information processor according to claim 1, further comprising:
   a request processing control module which selects an appropriate one of said plurality of modules for processing a request stored in said request-storing module and instructs the selected module to process the request.

3. The virtual space information processor according to claim 2, further comprising:
   a connection interface for transmitting processing instructions from said request processing control module to individual ones of said plurality of modules.

* * * * *